United States Patent
Zhang et al.

(10) Patent No.: US 9,626,998 B2
(45) Date of Patent: Apr. 18, 2017

(54) WRITE INTERFERENCE REDUCTION WHEN READING WHILE WRITING TO A HARD DISK DRIVE MEDIA

(71) Applicant: MARVELL INTERNATIONAL LTD., Hamilton (BM)

(72) Inventors: Jingliang Zhang, Singapore (SG); Zhimin Yuan, Singapore (SG); Siang Huei Leong, Singapore (SG); Budi Santoso, Singapore (SG); Pantelis Sophoclis Alexopoulos, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/903,783

(22) PCT Filed: Jul. 30, 2014

(86) PCT No.: PCT/SG2014/000363
§ 371 (c)(1),
(2) Date: Jan. 8, 2016

(87) PCT Pub. No.: WO2015/016782
PCT Pub. Date: Feb. 5, 2015

(65) Prior Publication Data
US 2016/0163351 A1    Jun. 9, 2016

(30) Foreign Application Priority Data

Jul. 30, 2013   (SG) ................................ 2013057856

(51) Int. Cl.
*G11B 5/02*       (2006.01)
*G11B 5/09*       (2006.01)
*G11B 20/10*      (2006.01)

(52) U.S. Cl.
CPC .. *G11B 20/10046* (2013.01); *G11B 20/10009* (2013.01)

(58) Field of Classification Search
CPC .. G11B 5/00; G11B 5/012; G11B 5/02; G11B 27/36; G11B 21/106; G11B 5/5526;
(Continued)

(56) References Cited

U.S. PATENT DOCUMENTS 8,873,177 B2 * 10/2014 Worrell .................. G11B 5/012
                                                       360/25
9,053,712 B1 * 6/2015 Guo ....................... G11B 5/012
(Continued)

OTHER PUBLICATIONS

International Search Report regarding Application No. PCT/SG2014/000363, mailed Oct. 20, 2014; ISA/AU.
(Continued)

*Primary Examiner* — Nabil Hindi

(57) ABSTRACT

A hard disk drive device and a method and apparatus for control of the hard disk drive is provided. The hard disk drive includes disk media, a slider head, a head gimbal assembly and a control means. The disk media includes at least two layers for data storage. The slider head flies above the disk media and includes a writer and a reader, and a head gimbal assembly supports the slider head above the disk media. The control means is physically coupled to the head gimbal assembly and electrically coupled to the writer and the reader for reducing write interference from the writer when the writer is writing to the disk media while the reader is reading from the disk media, wherein write interference is reduced in one or more of a time domain and a frequency domain.

16 Claims, 17 Drawing Sheets

(58) Field of Classification Search
CPC ............ G11B 5/59688; G11B 5/59627; G11B 20/10212
USPC ............ 360/24, 53, 76, 77.06, 77.05, 77.08, 360/77.07, 25, 45
See application file for complete search history.

(56) References Cited

U.S. PATENT DOCUMENTS

| | | |
|---|---|---|
| 2008/0198490 A1 | 8/2008 | Wu et al. |
| 2010/0020435 A1* | 1/2010 | Chen ...................... B82Y 10/00 360/77.02 |
| 2012/0229930 A1 | 9/2012 | Wang et al. |

OTHER PUBLICATIONS

Written Opinion regarding Application No. PCT/SG2014/000363, mailed Oct. 20, 2014.
Lorenz, M. "Buried Servo-Data Layer Structure for Magnetic Recording", Apr. 1, 1983, IP.com Prior Art Database Techinical Disclosure, IP.com No. 000045512 p. 1, Figs 1 and 2.

\* cited by examiner

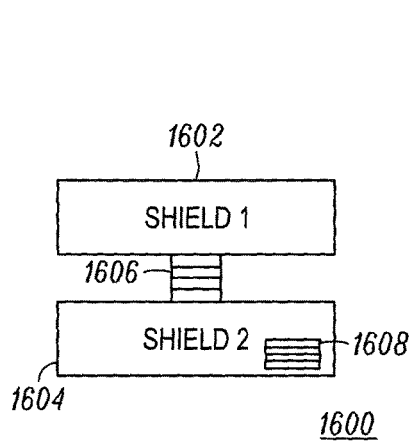
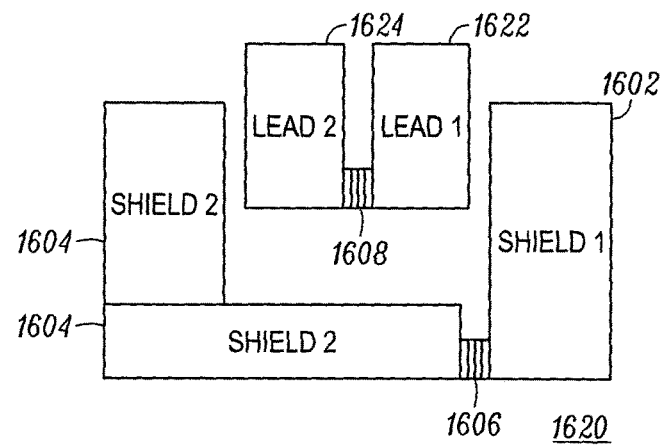
FIG. 16A  FIG. 16B
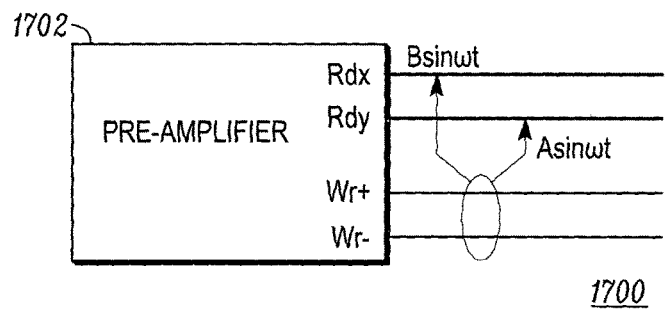
FIG. 17A
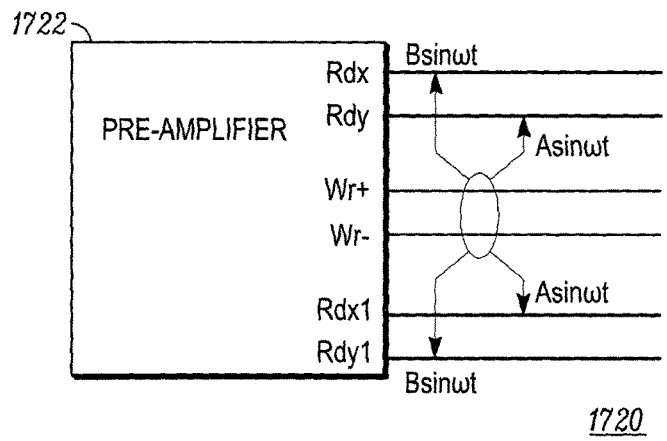
FIG. 17B

WRITE INTERFERENCE REDUCTION WHEN READING WHILE WRITING TO A HARD DISK DRIVE MEDIA

PRIORITY CLAIM

The present application claims priority to Singapore Patent Application No. 201305785-6, filed 30 Jul. 2013.

FIELD OF THE INVENTION

The present invention relates to hard disk drives. In particular, it relates to reading from a hard disk drive media while writing to the media.

BACKGROUND OF THE DISCLOSURE

Conventional hard disk drives have a media formed on a rotatable disk for storing information. The information is both servo information stored in servo sectors on the disk media and data stored in data areas between the servo sectors. A read/write head flies over the rotating disk in order to read information from both the servo sectors and the data areas and write information to the data areas. The servo information is used by the read/write head control system to determine the location of the read/write head relative to the servo sectors. However, when the read/write head is flying over a data area, there is no servo information available for servo feedback and control.

In a dedicated servo system, this issue is addressed by having a magnetic dedicated servo layer in addition to the usual magnetic data layer in the disk media. This may be referred to as a buried servo layer. With the additional dedicated servo layer, much or all of the servo information is placed into the buried servo layer, leaving more space in the data layer for data areas.

In conventional hard disk drives, the head either reads or writes, but cannot perform both operations simultaneously. However, in the dedicated servo implementation, in addition to increased data space, the dedicated servo layer allows reading location information and monitoring position signals from the servo layer even when the recording head is performing a data write operation.

Yet, during a write operation, the write signal is necessarily coupled to the read signal, interfering with reading the servo signal while writing to data areas. The interference of the write signal is likely much stronger than the read signal and therefore poses a challenge in the recovery of useful information from the servo signal while writing to the data layer.

Thus, what is needed is a method and apparatus for reducing or eliminating interference between the write signal and the read signal in order to advantageously implement the dedicated servo layer for a robust read while write operation. Furthermore, other desirable features and characteristics will become apparent from the subsequent detailed description and the appended claims, taken in conjunction with the accompanying drawings and this background of the disclosure.

SUMMARY

According to the Detailed Description, an apparatus for control of operations of a hard disk drive is provided. The apparatus for control of operations of a hard disk, drive includes a writer for writing onto a disk media of the hard disk drive and a reader for reading from the disk media of the hard disk drive. The apparatus for control of operations of a hard disk drive also includes write interference control for reducing write interference when the writer is writing to the disk media while the reader is reading from the disk media.

In accordance with another aspect, a method for control of a hard disk drive is provided. The method includes writing onto a disk media of the hard disk drive and reading from the disk media of the hard disk drive. The method further includes reducing write interference when the writer is writing to the disk media while the reader is reading from the disk media, wherein write interference is reduced in one or more of a time domain and a frequency domain.

In accordance with a further aspect, a hard disk drive device is provided. The hard disk drive includes disk media, a slider head, a head gimbal assembly and a control means. The disk media includes at, least two layers for data storage. The slider head flies above the disk media and includes a writer and a reader, and a head gimbal assembly supports the slider head above the disk media. The control means is physically coupled to the head gimbal assembly and electrically coupled to the writer and the reader for reducing write interference from the writer when the writer is writing to the disk media while the reader is reading from the disk media.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 3, including FIGS. 3A and 3B, depict graphs of frequency spectrums of a write coupling response in accordance with the present embodiment for a particular read/write head, wherein FIG. 3A depicts the write coupling response for a single write pulse at 150 MHz and FIG. 3B depicts the write coupling response for a single write pulse at 500 MHz.

FIG. 12, including

FIG. 16, including FIGS. 16A and 16B, illustrates a bottom planar view and a side planar cross-section view of reference reader in accordance with a first embodiment.

FIG. 17, including FIGS. 17A and 17B, illustrates a block diagram and trace line implementation of typical trace lines from the preamplifier to the head/slider and trace lines from the preamplifier to the head/slider in accordance with the first embodiment.

FIG. 18, including

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present methods and apparatus for write interference suppression during reading while writing in a hard disk drive environment.

In hard disk drives (HDDs), an actuator arm rotates about its pivot and the disk media is rotated below the actuator arm in order to locate the slider head (mounted at one end of the actuator arm to allow it to "fly" over the disk) over a particular location on a particular track for writing information to and/or reading information from such location. Thus, it is necessary for the actuator arm to "know" the particular location it is over at any one time. This "knowledge" is gained by reading servo information from the disk media.

Figure 1:
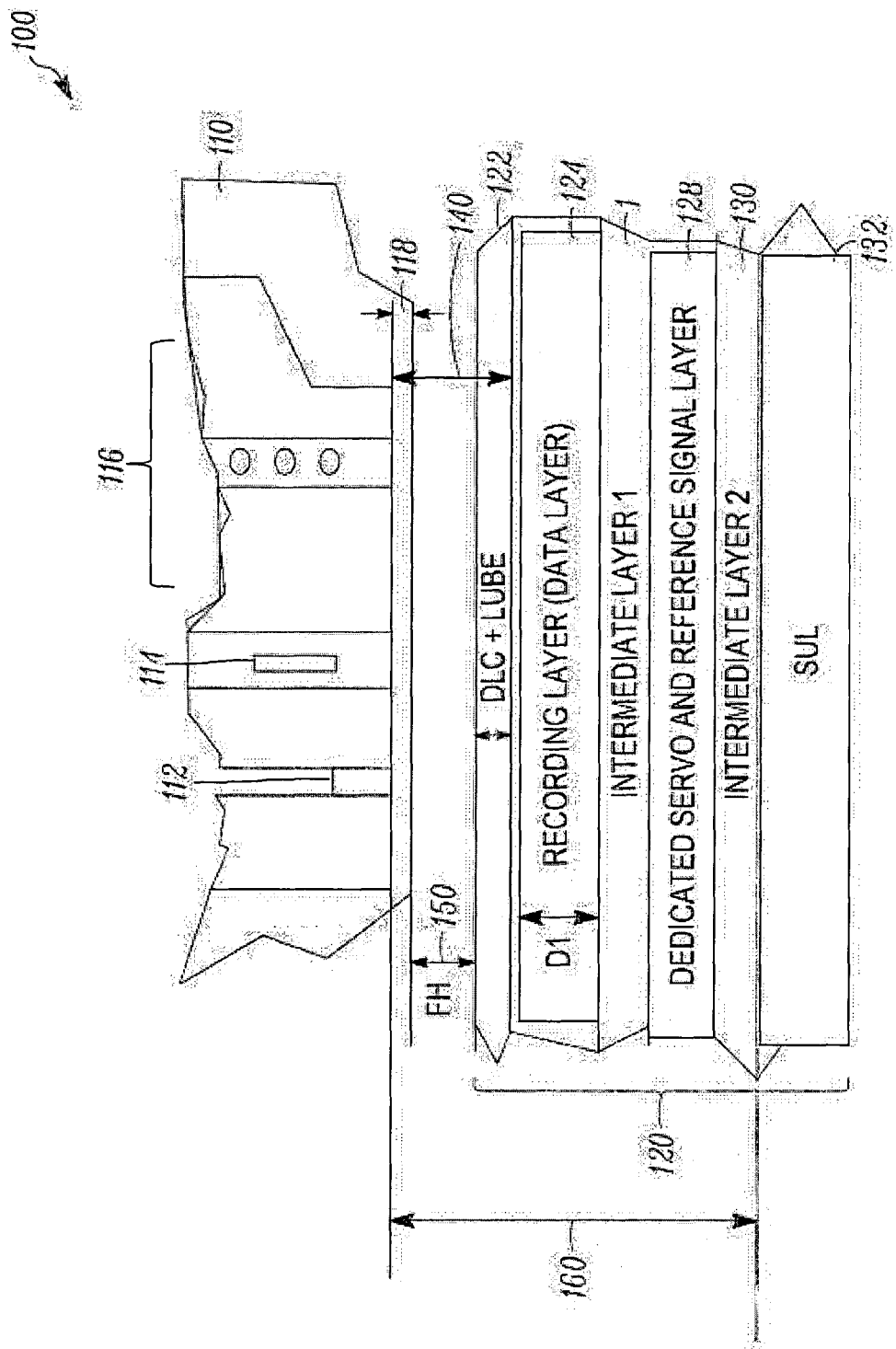
FIG. 1 depicts a cross-sectional view of a dedicated servo configuration for a hard disk drive system in accordance with a present embodiment.

In accordance with a present embodiment, a dedicated servo layer is located below the data magnetic layer within the disk media. Referring to FIG. 1, a cross-sectional view 100 shows the configuration of a dual layer media configuration with a dedicated servo layer in accordance with the present embodiment. A slider head 110 flies over a disk media 120 for reading servo location information and reading and writing data therefrom. The slider head 110 includes a reader 112 such as a read element, a heater 114 for thermal fly height control, a writer 116 including such as write pole and writing coil, and a slider overcoat 118. In accordance with the present embodiment, the disk media 120 includes a top overcoat and lubrication layer 122, a data layer 124 for magnetically reading data from and writing data to the disk media 120, a first intermediate layer 126, a dedicated servo layer 128, a second intermediate layer 130 and a substrate underlayer (SUL) 132. A magnetic spacing 140 defines the distance between the reader 112 and the writer 116 and the data recording layer 124. The width of the magnetic spacing 140 is dependent on a fly height 150 between an underside of the slider head 110 and a top surface of the disk media 120. Finally, a head keeper spacing 160 is the distance from the top of the SUL 132 and the underside of the slider head 110.

While conventional HDDs have servo information embedded in servo sectors between data areas in a single data recording layer, the separate magnetic layer 128 dedicated for servo information provides continuous servo information. In this manner, position error signal (PES) and other location determining information can be continuously read by the reader 112 on the slider head 110 as it "flies" over the disk media 120.

The reader 112 reads a readback signal for both data reading and reading of servo information. In a conventional HDD, the servo information is readily obtained via the readback signal when the reader flies over the servo sectors. It is not necessary for this readback process to occur during a write process as the two processes will never occur simultaneously. In addition, the write signal would provide substantial interference with the readback signal during the write process.

Yet, in the dedicated servo system such as the configuration shown in the view 100, it is necessary to recover the servo signal and servo information even during the write process. Thus, it is an object of the present embodiment to provide a method to suppress, reduce, or remove the write coupling signal to be able to perform meaningful servo layer 128 readback while writing to the data layer 124.

Figure 2:
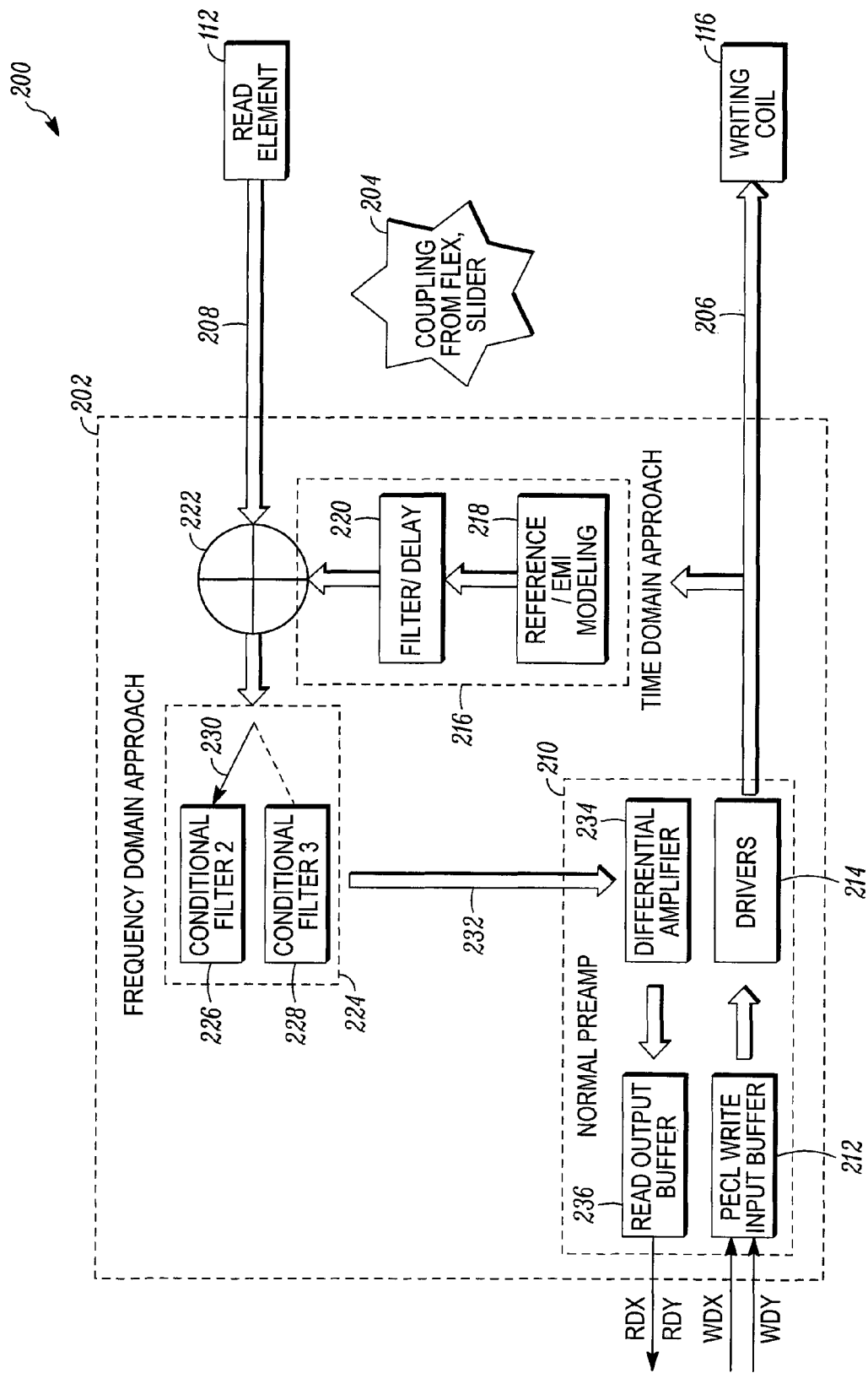
FIG. 2 depicts a block diagram of a simultaneously read/write capable pre-amplifier with write coupling suppression in accordance with the present embodiment.

Referring to FIG. 2, a block diagram 200 depicts a schematic for write coupling, suppression in a simultaneously read/write (R/W) or read-while-write (RWW) enabled preamplifier (Preamp) 202 in accordance with the present embodiment. The RWW interference between a writing signal 206 and a readback signal 208 is represented by coupling 204. This coupling 204 can take place between traces on the flex (connecting the Preamp 202 to the slider head 110) or in the slider head 110 (FIG. 1). The resulting interfered readback signal 208 is read by the Preamp 202.

A normal preamp 210 generates the write signal 206 by receiving write signals WDX, WDY at a positive emitter-coupled logic (PECL) write input buffer 212. When over the appropriate region of the data layer 124 on the disk media 120, the signal are provided from the buffer 212 to drivers 214 for providing the write signal 206 to drive the writing coil 116. In accordance with the present embodiment, the RWW preamp 202 includes additional components and circuitry as described herein that provides means to remove, suppress, or reduce the write signal 206 coupling to the read (or readback) signal 208 during the write process. Two approaches to suppress the write signal 206 coupling to the read signal 208 during the write process are presented in accordance with the present embodiment: a frequency domain approach and a time domain approach.

In regards to the time domain approach, the read signal 208 is compensated in the time domain by predicting the write coupling/interference signal in the time domain. The write coupling/interference signal in the time domain is predicted by obtaining the response (write coupling) of a single write pulse. Since a write signal is composed of a combination of such write pulses in the time domain, it is possible to obtain a predicted response by combining individual responses from each write pulse making up the write signal. Thus, a time domain write interference suppression module 216 is coupled to the write signal 206 for operation when the writer is writing to the disk media 120. The time domain write interference suppression module 216 includes a reference signal generating means 218 and a signal delay means 220. The resulting generated reference write signal from the signal delay means 220 is subtracted from the read signal 208 via a mixer 222. The reference write signal is generated by the reference signal generating means 218 in response to the write pulses on the write signal 206 and modeled responses of write pulses previously obtained. The reference write signal is appropriately delayed by the signal delay means 220 before injection to the read signal 208 at the mixer 222 in order to suppress any write interference when the writer 116 is writing to the disk media 120 while the reader 112 is reading from the disk media 120.

In regards to the frequency domain approach, the servo information in the readback signal 208 being read from the dedicated servo layer 128 has a different frequency range as compared to frequency ranges of data signals. Similarly, it has been determined that the write coupled signal in the readback signal 208 has the write coupling or interference signal with dominant frequency components in a different frequency range as compared to the servo information. Since the two signals are predominantly in different frequency ranges, in accordance with the present embodiment the write coupling signal is suppressed by frequency filtering while leaving the desired servo signal largely intact. Thus, a frequency domain write interference suppression module 224 includes one or more filters 226, 228 that can be coupled to the readback signal 208 by a filter selector 230 for filtering out write interference from the readback signal 208 when the writer 116 is writing to the disk media 120 while the reader 112 is reading from the disk media 120. In this manner, the frequency domain approach utilizes a single filter 226 or a combination of filters 226, 228 to suppress the write coupling and allow recovery of the servo signal. The filtered readback signal 232 (e.g., the recovered servo signal) is provided to a differential amplifier 234 of the preamplifier 210 and then to a read output buffer 236 for provision of readback signals RDX and RDY.

Figure 3A:
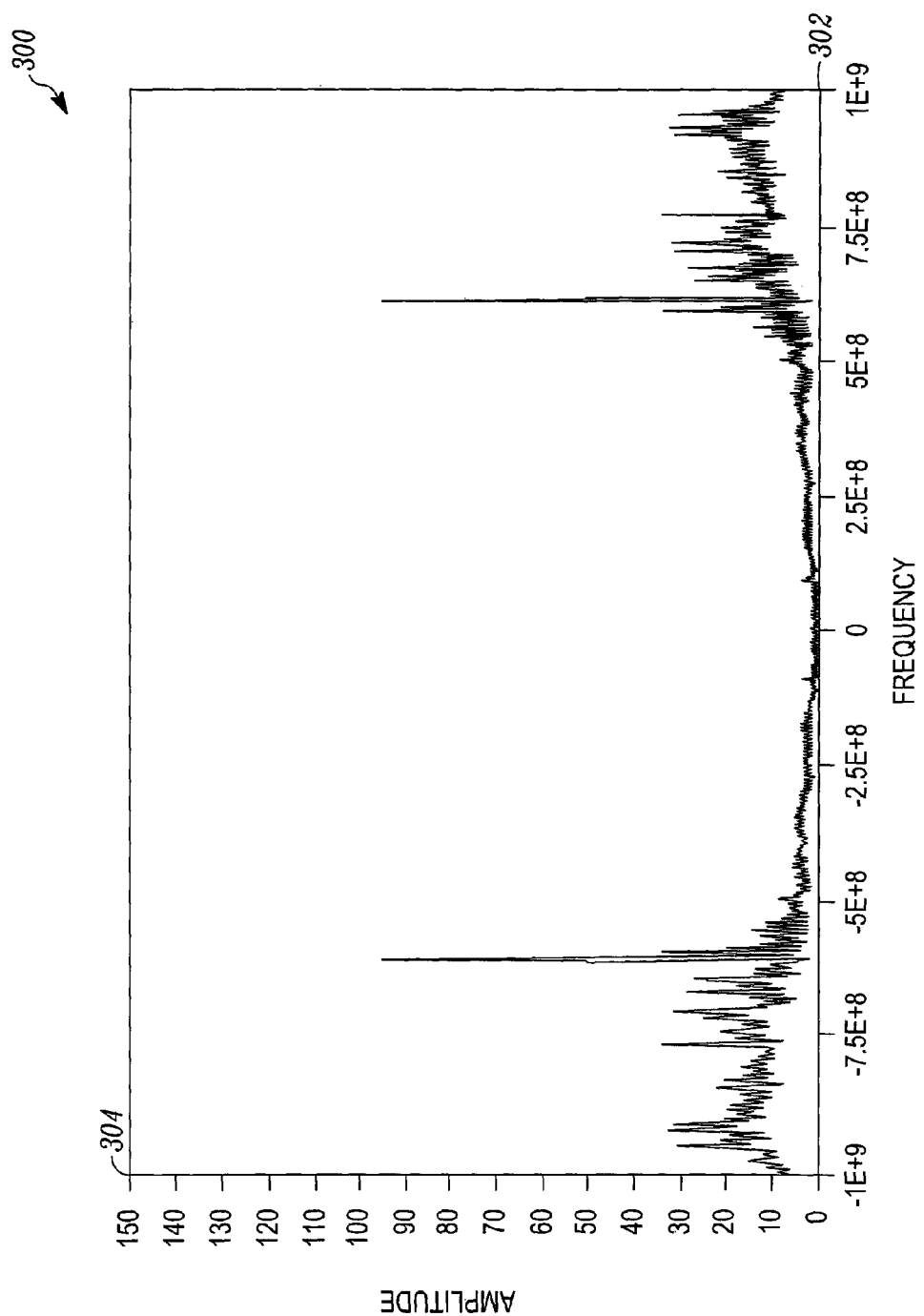
Figure 3B:
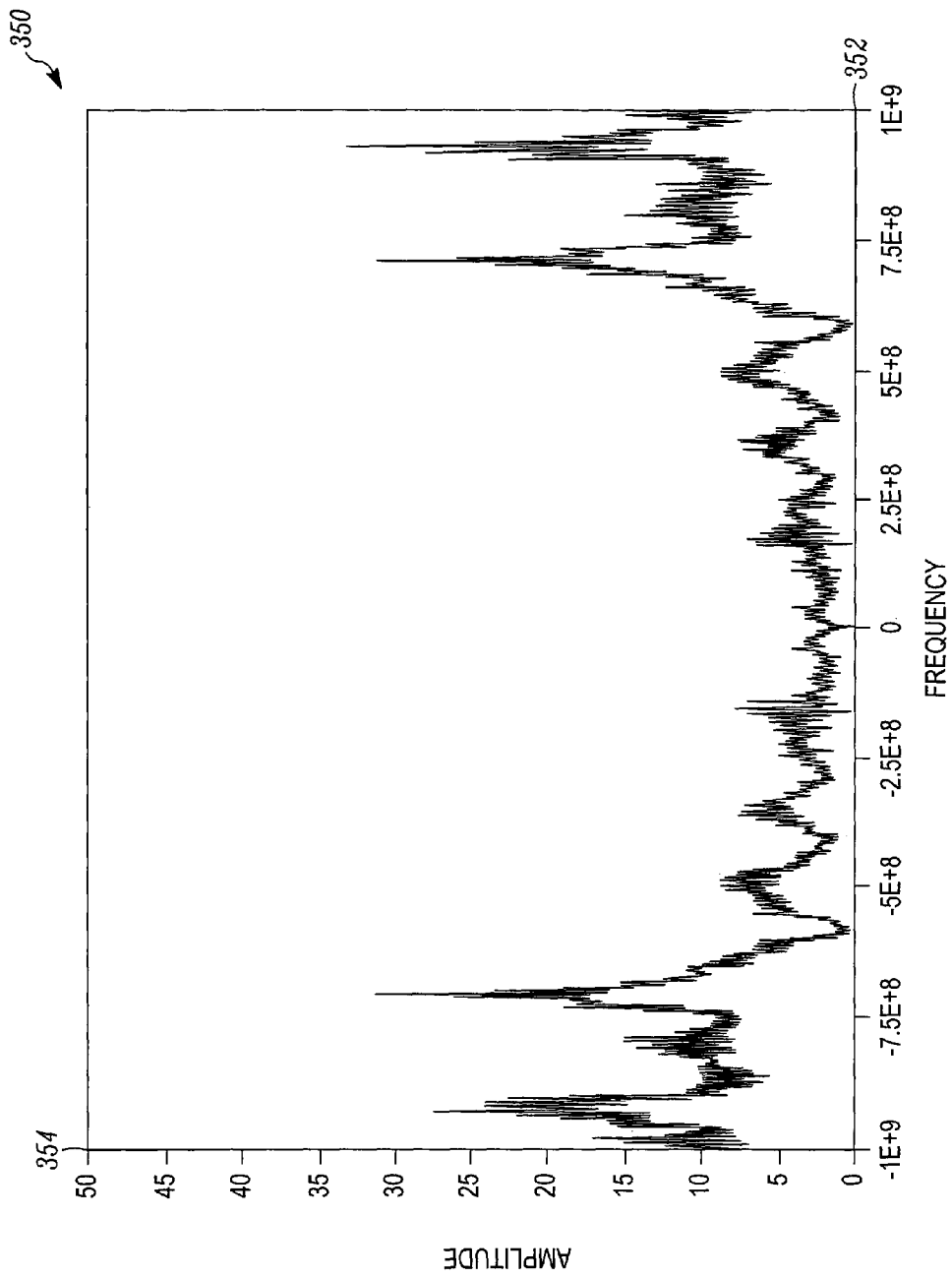

FIG. 3, including FIGS. 3A and 3B, depicts graphs 300,350 of frequency spectrums of a write coupling response in accordance with the present embodiment for a particular read/write head. More particularly, FIG. 3A depicts the graph 300 of the write coupling response for a single write pulse at 150 MHz where a signal's frequency is plotted along an x-axis 302 and the signal's amplitude is plotted along the y-axis 304. FIG. 3B depicts the graph 350 of the write coupling response for a single write pulse at 500 MHz where the signal's frequency is plotted along an x-axis 352 and the signal's amplitude is plotted along the y-axis 354. The range of the servo signal is typically within 0 to 100 MHz. It can be observed from the graphs 300, 350 that there are few dominant frequency components in the typical range of the servo signals.

Figure 4:
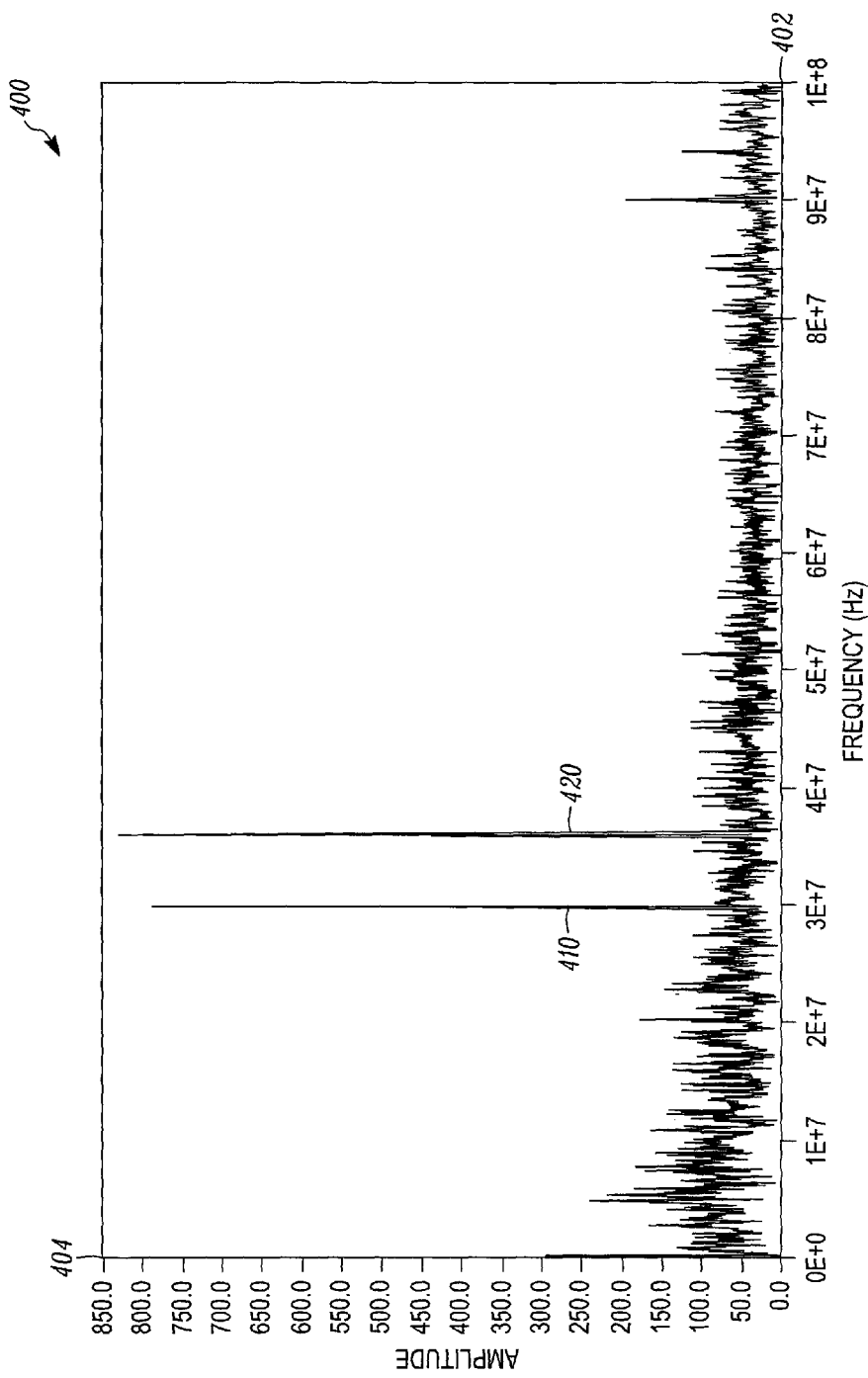
FIG. 4 is a graph illustrating a frequency spectrum of a readback signal containing dual-frequency servo information with interference from a pseudorandom write signal coupled inside.

Referring to FIG. 4, a graph 400 with frequency plotted along an x-axis 402 and amplitude plotted along a y-axis 404 shows the frequency spectrum of a readback signal containing dual-frequency servo information 410, 420 interfered or coupled with a 150 MHz pseudorandom write signal. The two peaks of the dual frequency servo 410, 420 are clearly seen above the background noise from the write interference or coupling.

Figure 5:
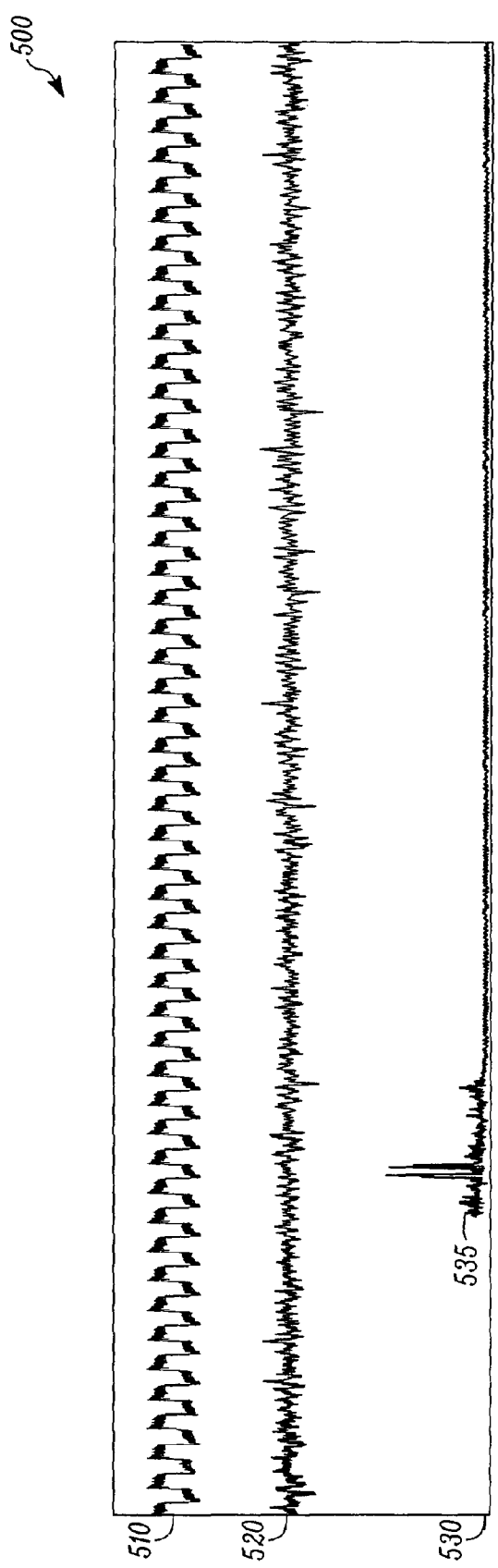
FIG. 5 illustrates the readback signal of FIG. 4 after passing through a low pass band filter in accordance with the present embodiment.

Referring to FIG. 5, reference numeral 520 denotes a time domain signal corresponding to the frequency spectrum in graph 400 (FIG. 4.). Using a single low pass filter 226 (FIG. 2) removes portions of the readback signal of FIG. 4 higher than 90 MHz to obtain a filtered signal 530. As one skilled in the art will observe, the high frequency components are completely removed from the filtered signal 530, leaving behind the frequency range useful for reading the servo signal.

Figure 6:
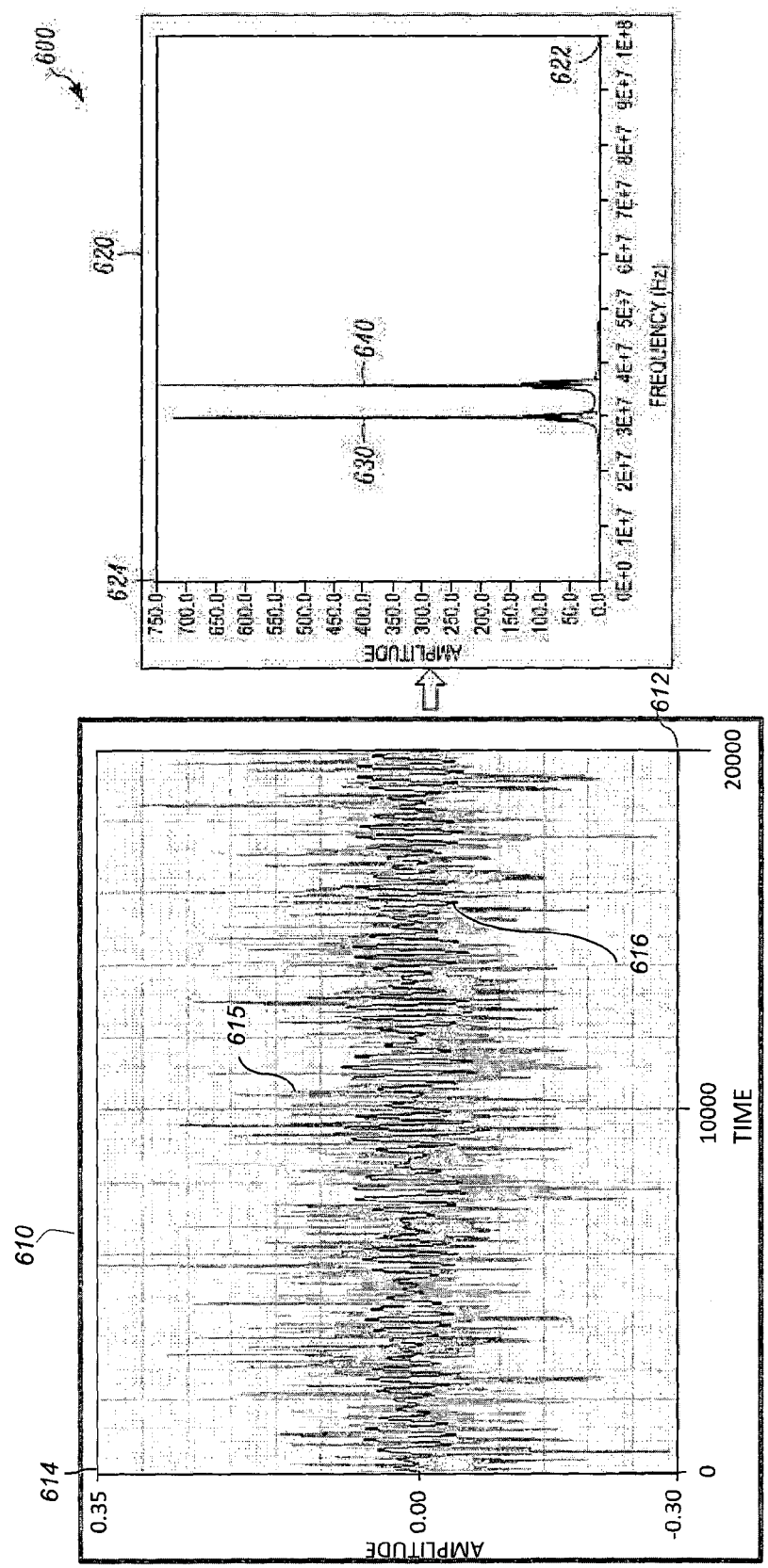
FIG. 6 illustrates the readback signal of FIG. 4 after passing through a bandpass filter and a bandstop filter in accordance with the present embodiment.

FIG. 6 shows an illustration 600 including a first graph 610 having time plotted along the x-axis 612 and amplitude plotted along the y-axis 614 and a second graph 620 having frequency plotted along the x-axis 622 and amplitude plotted along the y-axis 624. In accordance with the present embodiment, the time domain graph 610 and the frequency domain graph 620 depict use of a combination of a bandpass filter 226 with a bandstop filter 228 to filter the readback signal of FIG. 4 having the servo signal being coupled with or interfered with the 150 MHz pseudorandom write signal as shown by reference numeral 615. The recovered signal after filters 226, 228 is denoted by reference numeral 616 in FIG. 6, the combined servo signal 630, 640 in time domain. Both the time domain waveform graph 610 and the frequency domain graph 620 show that the dual frequency servo signal 630, 640 is cleanly recovered, while the write coupling signal is removed or effectively suppressed.

Figure 7:
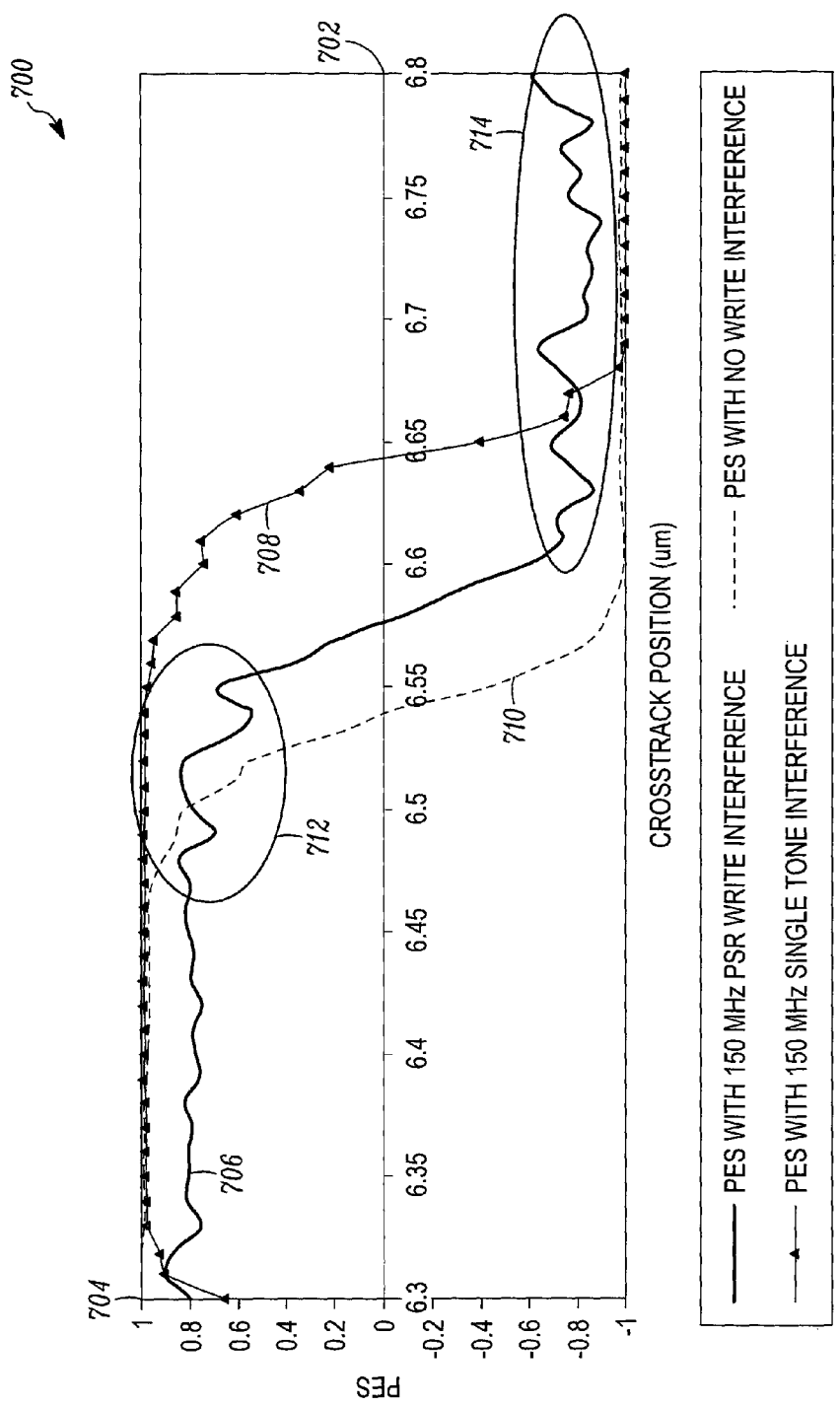
FIG. 7 illustrates the position error signal (PES) transfer curve as read from the dedicated servo layer and after using the combination of filters used to generate the filtered readback signal in FIG. 6.

Referring to FIG. 7, a graph 700 having crosstrack position plotted along the x-axis 702 and position error signal (PES) plotted along the y-axis 704 shows the position error signal (PES) transfer curve after using the combination of filters 226, 228 used for filtering to obtain the signal in the graph 620. The PES information is critical for servo feedback and control and, in accordance with the present embodiment, can be cleanly recovered even, during a writing process where the write signal couples into the readback signal. A first PES transfer curve 706 shows the PES with a 150 MHz pseudorandom write interference signal, a second PES transfer curve 708 shows the PES with a 150 MHz single tone write interference signal, and a third PES transfer curve 710 shows the PES with no write interference signal. In regards to the first PES transfer curve 706, portions 712 and 714 show the effects of some of the pseudorandom signal inside the pas band of the filter 226 which still do not affect the recovery of the PES signal.

Turning next to the time domain approach, this approach compensates the readback signal 208 in the time domain by predicting the write coupling/interference signal in the time domain. One way to predict the write coupling/interference signal in the time domain is by obtaining the response (write coupling) of a single write pulse. Considering that a write signal is composed of a combination of such write pulses in the time domain, it is possible to obtain a predicted response by combining individual responses from each write pulse making up the write signal.

Figure 8:
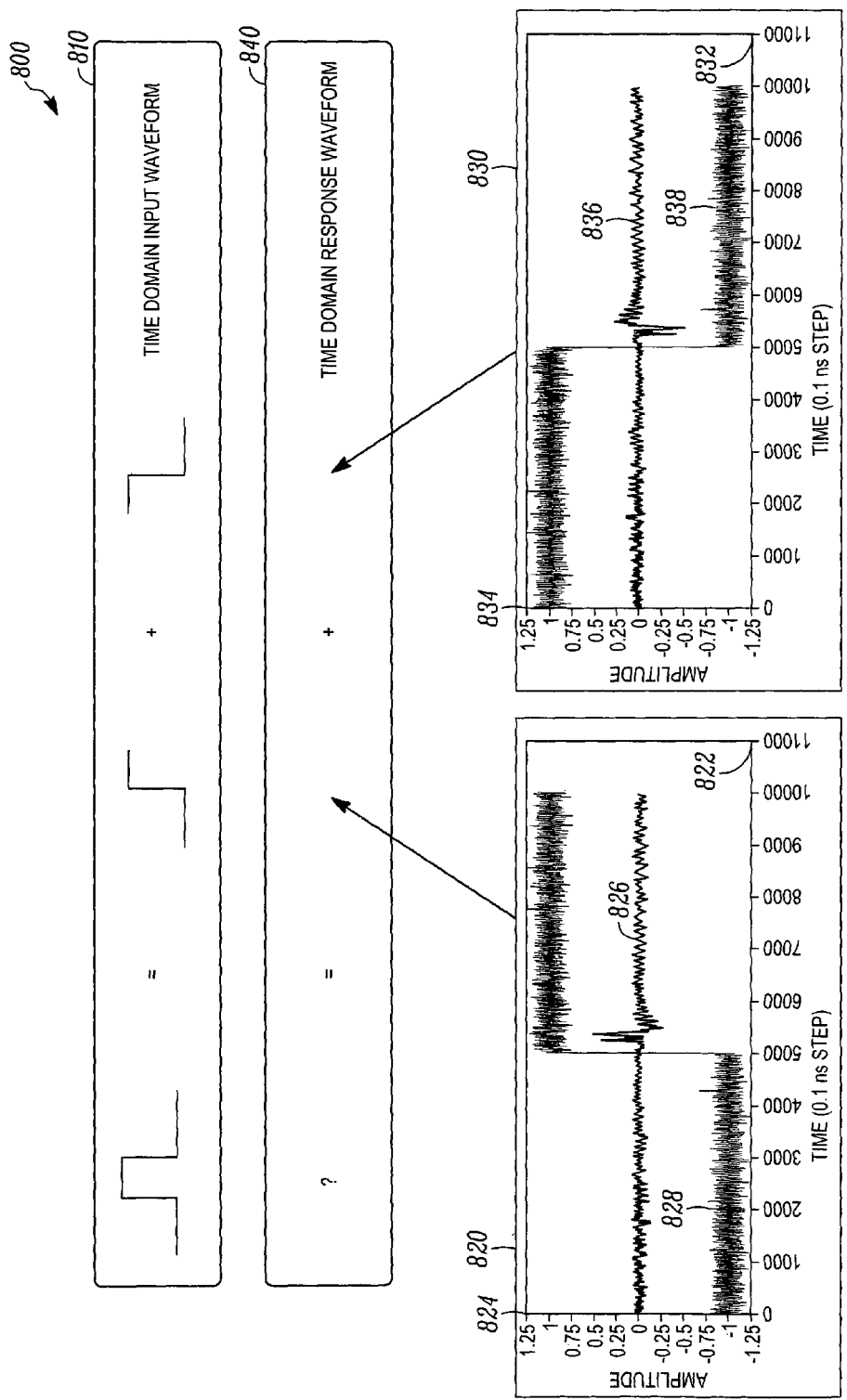
FIG. 8 illustrates the concept of using "elementary building blocks" of coupled write responses from rising and falling edge of the write signal in the time domain in accordance with the present embodiment.

FIG. 8 illustrates the concept of using "elementary building blocks" whereby the write coupling is composed of rising edge and falling edge responses. A time domain input waveform 810 depicts that a single pulse is composed of a rising edge followed by a falling edge. A first time domain graph 820 having time plotted along an x-axis 822 and amplitude plotted along a y-axis 824 shows a rising edge response 826 of a write coupling signal 828. A second time domain graph 830 having time plotted along an x-axis 832 and amplitude plotted along a y-axis 834 shows a rising edge response 836 of a write coupling signal 838. As the write coupling is composed of rising edge and falling edge responses, a time domain response waveform 840 can be generated by combining the rising edge response 826 and the falling edge response 836 as "building blocks".

Figure 9:
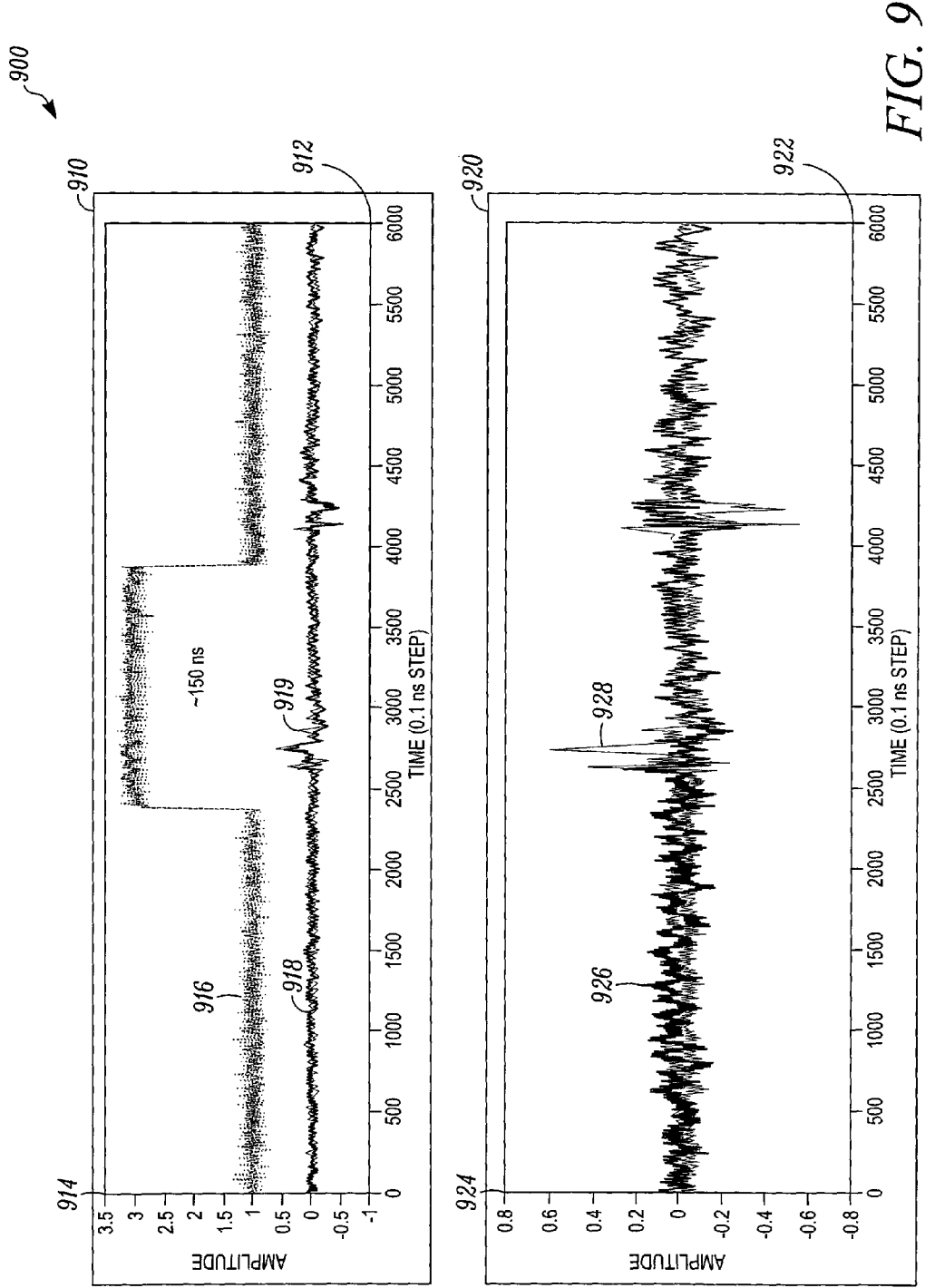
FIG. 9 illustrates time domain write interference suppression for a 150 ns write pulse.
Figure 10:
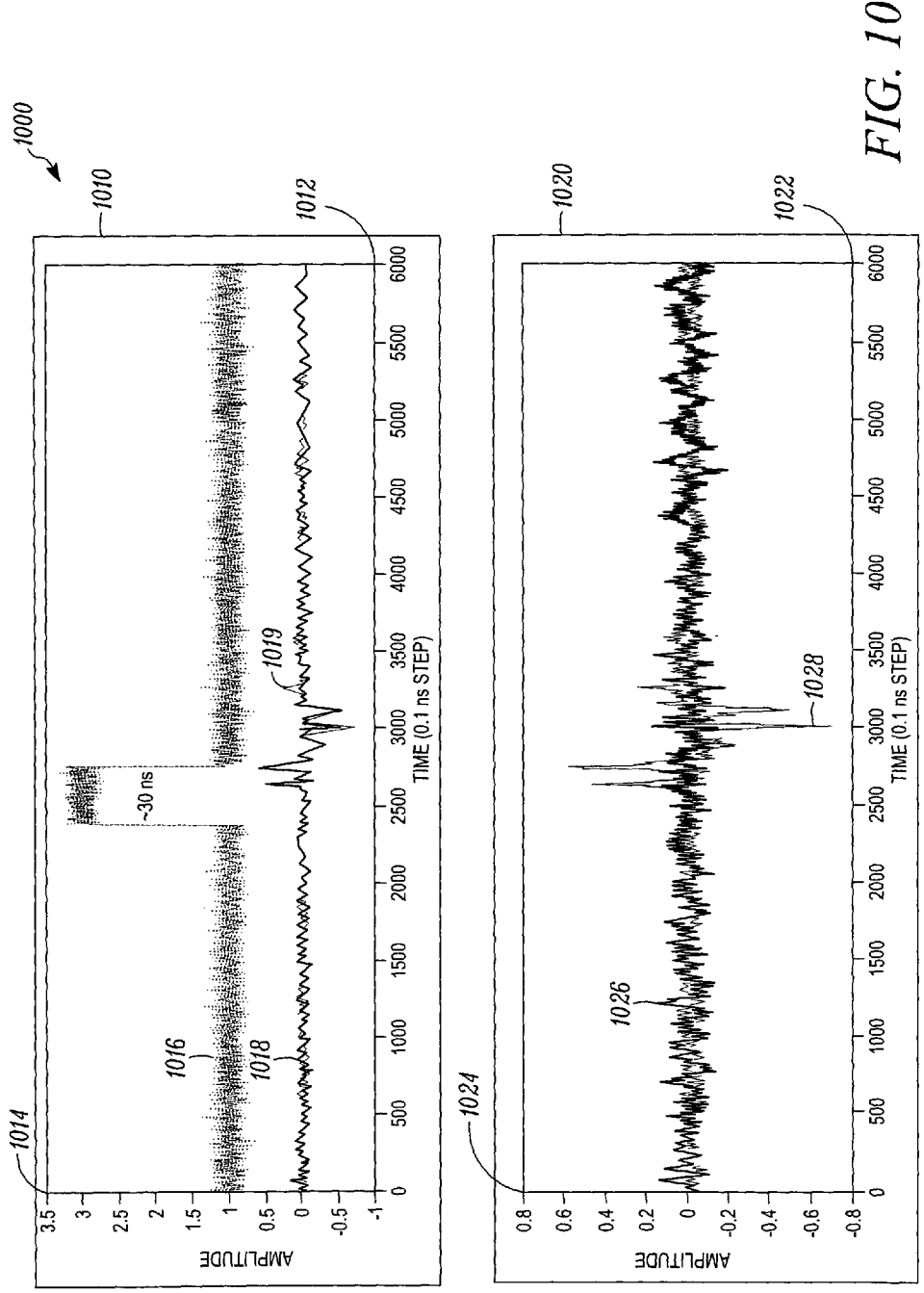
FIG. 10 illustrates time domain write interference suppression for a 30 ns write pulse.

FIGS. 9 and 10 show the time domain write interference suppression for a 150 ns write pulse and a 30 ns write pulse, respectively. Referring to FIG. 9, an illustration 900 depicts a first graph 910 having time plotted on the x-axis 912 and amplitude plotted on the y-axis 914. An actual step response 918 of the 150 ns write pulse 916 is shown overlapping a synthesized coupled response 919, and the synthesized coupled response 919 shows good agreement to the actual step response 918. A second graph 920 has time plotted on the x-axis 922 and amplitude plotted on the y-axis 924. An original write interference 928 is shown with a suppressed write interference signal 926 generated by subtracting a predicted response from the actual write interference. The write coupled signal in the readback signal consists of responses from the rising and falling edge of a single write pulse. By predicting the expected write coupling from the rising and falling edge responses and subtracting it from the readback signal during writing, the write coupling may be suppressed. This is also shown in FIG. 10, where an illustration 1000 depicts a first graph 1010 having time plotted on the x-axis 1012 and amplitude plotted on the y-axis 1014. An actual step response 1018 of the 30 ns write pulse 1016 is shown and overlapping with a synthesized step response 1019, and good agreement is observed between the actual step response 1018 and the synthesized step response 1019. A second graph 1020 has time plotted on the x-axis 1022 and amplitude plotted on the y-axis 1024. An original write interference 1028 is shown with a suppressed write interference signal 1026 generated by subtracting a predicted response from the actual write interference Besides using a response from a single write pulse to predict the interference or write coupling, in accordance with the present embodiment a reference head gimbal assembly (HGA) or reference component/circuitry approach may be used. If the reference HGA is used, the reference HGA is manufactured to specifications and similar to the actual HGA in use. Thus, the response from the reference HGA is similar to that of the actual HGA. In this manner, the reference response from the reference HGA can be used to predict, and therefore subtract, the write coupling in the actual readback signal. In a preamp implementation, this can be in the form of a separate set of Read/Write lines (e.g., trace lines) to the reference HGA or a reference component/circuitry that has the same frequency response as the HGA in use.

Figure 11:
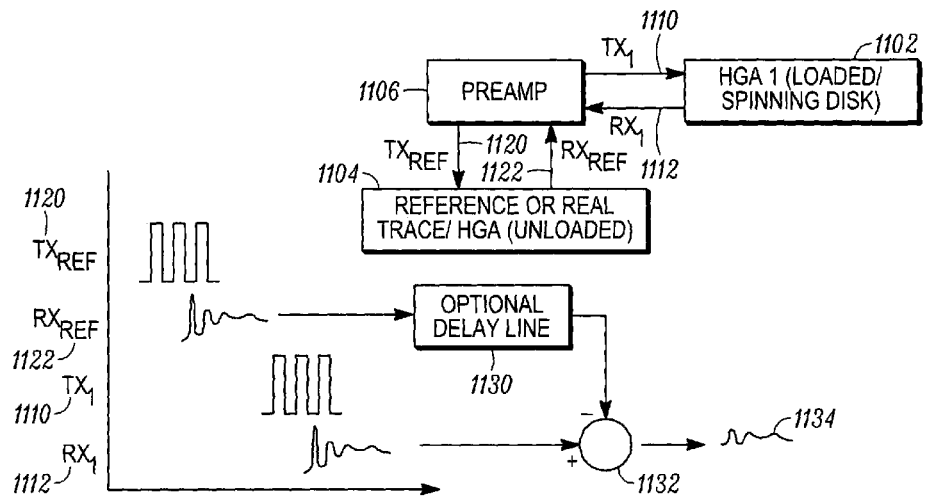
FIG. 11 illustrates an approach for predicting a write coupling response by using a reference head gimbal assembly (HGA) signal or reference trace signal wherein a target useful readback signal is recovered by subtracting a predicted write coupling response.

Referring to FIG. 11, an illustration 1100 depicts this approach. To predict the write coupling response, a $TX_{REF}$ 1120 similar to a write signal $TX_1$ 1110 sent to a loaded HGA 1102 is sent to a reference unloaded HGA 1104 from a preamp 1106. The responses $RX_{REF}$ 1122 are readback and recorded. Subsequently, this recorded response $RX_{REF}$ 1122 is subtracted at mixer 1132 in a time domain synchronized manner (i.e., using an optional delay line 1130 for time domain synchronicity) from a received response $RX_1$ 1112 when the actual write signal $TX_1$ 1110 is sent out to form the write interference suppressed signal 1134. Thus, the readback signal during the write process will have a write coupling response that is suppressed or subtracted away by the recorded reference signal. In some cases, the predicted coupling response can be used to subtract the interference signal in real-time without needing to first record the predicted coupling response.

Instead of using a reference HGA which requires significant additional space in a HDD to accommodate, it is possible, as introduced above, to use a reference trace/reader approach.

Due to shrinking read sensor dimensions on the HDD slider, the readback signal is weakened and may become too weak to support continued areal or track density increases. An alternative is to employ multiple readers on one head to increase the strength of the readback signal or use signal processing to process the signal from multiple heads to increase the signal-to-noise ratio (SNR).

In a Two Dimensional Magnetic Recording (TDMR) head implementation, there may be multiple readers in a single head/slider. Multiple readers mean additional traces in the suspension that need to connect to the additional readers. Thus, manufacturing multiple traces/readers on a single head/slider/HGA is possible. It is also possible to add extra trace/readers for a single head/slider/HGA. The extra trace/reader can be designed and fabricated to have the same performance and specifications as the existing trace/reader on the head/slider/HGA. This extra trace will sustain the same write interference and write coupling as the trace of other read sensors and traces when writing occurs. In order to further improve the method, the extra read sensor connected to the extra trace can be designed to not sense any extrinsic signals, such as by shielding it or by positioning it at a large distance from the magnetic media. In this manner, the only signal it is reading is the write interference or write coupling signal.

Figure 12A:
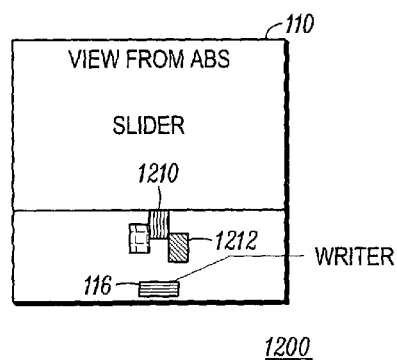
FIGS. 12A and 12B, illustrates a bottom planar view and a side planar view of a reference trace/reader approach and implementation.
Figure 12B:
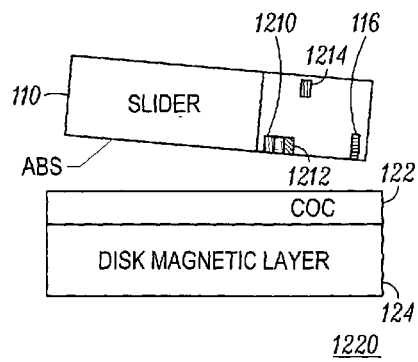

FIG. 12, comprising FIGS. 12A and 12B, illustrates the additional read sensor (reference reader) variant of the present embodiment. FIG. 12A is a bottom planar view 1200 of the slider 110 in accordance with the variant of the present embodiment, and FIG. 12B is a side planar view 1220 of the slider 110 in accordance with the variant of the present embodiment. Multiple read sensors 1210, 1212 including a reference read sensor 1214 are mounted on the slider along with the writer 116. As can be seen from FIG. 12B, the reference read sensor 1214 has a large clearance over the magnetic layer 124 on the disk media 120. The reference reader 1214, thus, will not pick up the readback signal from the magnetic disk media that the other read sensors 1210, 1212 pick up. However, the trace lines connected to the reference reader 1214 will read the same write interference as the other read trace lines. Therefore, the signal from the reference reader 1214 and its trace will consist only of the interference from the write operation and not include any readback signals for the magnetic disk media 124. In this manner, the extra trace and its accompanying reader 1214 can generate a signal for suppression of the write interference and be subtracted from the signal from the active read sensor 1210, 1212 and its trace. Thus, by subtracting the write interference signal obtained from the reference reader 1214 and its trace, the readback signal obtained from the active read sensors 1210, 1212 can have the write coupled interference signal suppressed and, so, contain mostly useful signaling from reading the disk media.

Figure 13:
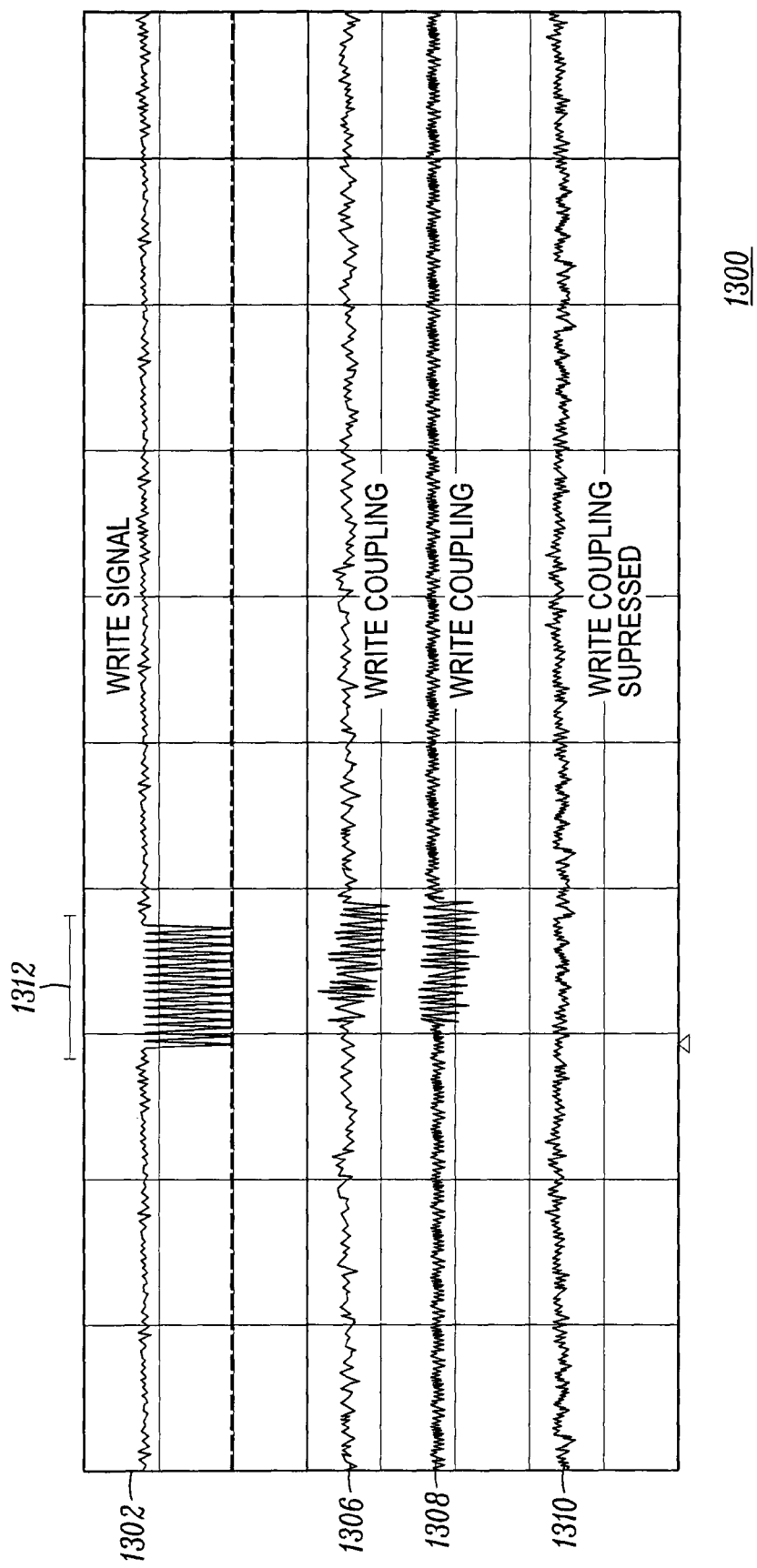
FIG. 13 illustrates using an unloaded HGA's response to write interference as a reference for write interference suppression/cancellation for another loaded HGA of the same type.

FIG. 13 illustrates a view 1300 of signals during writing when an unloaded HGA is used for generating the reference signal for suppressing write interference on the readback signal on a loaded HGA. A signal 1302 depicts the write signal. Signals 1306 and 1308 depict the write coupling response on the loaded HGA reader and the unloaded HGA reader, respectively. A signal 1310 depicts the write interference suppressed signal where the reference signal 1308 is subtracted from the readback signal 1306. Reviewing the signal patterns 1302, 1306, 1308 during a time 1312, it is clear to one skilled in the art that an unloaded HGA's response is a good predictor of write interference for another loaded HGA of the same type. This result can be applied to having an additional reference trace/reader on a single same head/HGA to be used as reference for write interference cancellation or suppression for other active traces/readers.

Figure 14:
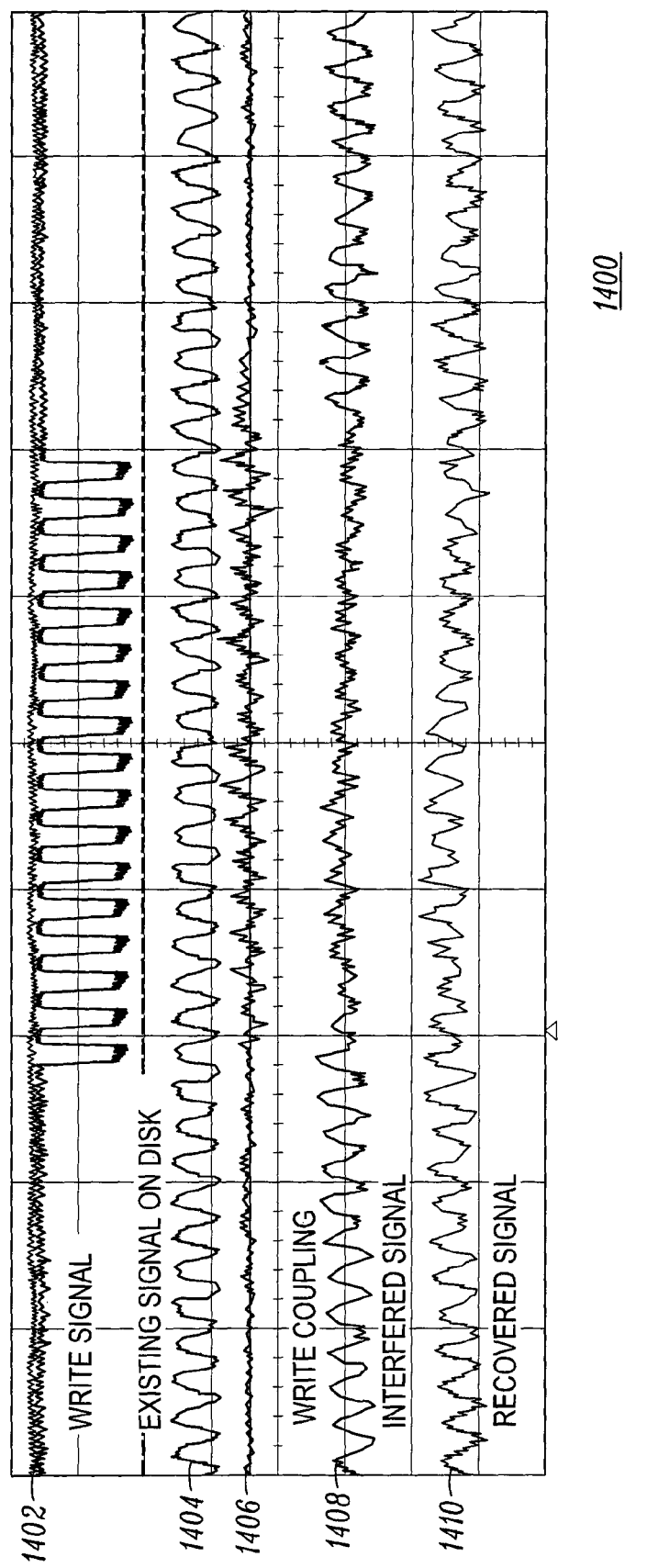
FIG. 14 illustrates canceling/suppressing write coupling/interference during write operation by subtracting the write coupling/interference signal from the raw readback signal where the readback signal is a single frequency pattern written on the disk.

The signals depicted in a view 1400 of FIG. 14 show that write coupling/interference during a write operation can be cancelled and/or suppressed by subtracting the write coupling/interference signal from the raw readback signal. A write signal 1402 is shown above an existing signal 1404 read from the disk media 120. A signal 1406 shows the write coupling interference and a signal 1408 shows a write coupling interfered signal 1408 read from the disk media 120. Write interference can be removed from the signal 1408 by removing the signal 1406 to obtain a recovered write interference suppressed signal 1410. As discussed above, the write coupling/interference signal for suppression can be obtained from the reference trace/reader/HGA. The resulting signal 1410 is a strong recovered signal that has write interference removed or suppressed.

Figure 15:
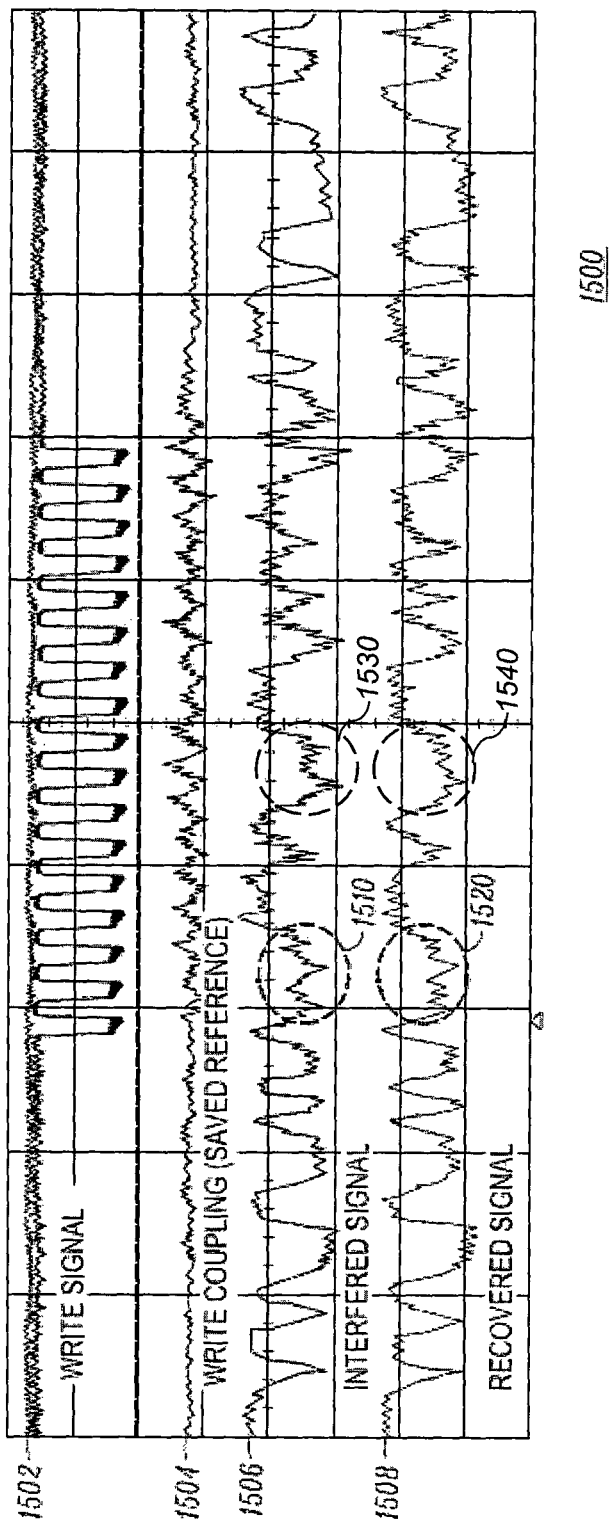
FIG. 15 illustrates canceling/suppressing write coupling/interference during a write operation by subtracting the write coupling/interference signal from the raw readback signal where the readback signal is a pseudorandom pattern written on the disk.

The readback signal 1404 is a single frequency pattern written on the disk. Referring to FIG. 15, an illustration 1500 depicts similar signaling as FIG. 14 except that a readback signal from the disk is from a track written with a pseudo-random pattern. Thus, a write signal 1502 is shown above a signal 1504 showing the write coupling interference and a write coupling interfered signal 1506 read from the disk media 120. Write interference can be removed from the signal 1506 by removing the signal 1504 to obtain a recovered write interference suppressed signal 1508. Comparing a portion 1520 of the recovered write interference suppressed signal 1508 to a portion 1510 of the write coupling interfered signal 1506, the portion 1520 shows reduced or suppressed interference. Similarly, comparing recovered another portion. 1540 of the recovered write interference suppressed signal 1508 with another portion 1530 of the write coupling interfered signal 1506, the portion 1540 shows reduced or suppressed interference.

In current HDDs, there is a need to design for reduction of and/or shielding of electromagnetic interference (EMI). EMI or electromagnetic noise from surroundings can affect HDD operation. Thus, HDDs have design considerations such as (but not limited to) overlapping or overhanging edges on the HDD enclosure, metallic shielding tape, or metallic particle bond or fillers to reduce and shield EMI.

It is possible to use the reference trace/reader approach discussed above as an in-situ sensor for EMI. The EMI signal detected by the reference trace/reader will be similar to that experienced by other reader/traces and can be used for cancellation of the EMI noise in read line signals during read or write operation. In this manner, cost savings can result as EMI design considerations for HDD can be relaxed when using an EMI suppression scheme based on the reference trace/reader approach.

Various embodiments for implementing reference trace and reader are possible. The reference trace and reader can make use of an existing trace and reader on a multiple reader TDMR head and/or slider or be an additional trace and reader added to an existing HGA.

FIG. 16 and FIG. 18 depict two possible embodiments for reference reader location (the reference trace leading to the reference reader is not shown). Referring to FIG. 16, including FIGS. 16A (a bottom planar view 1600) and 16B (a side planar cross-sectional view 1620), a first embodiment depicts a first shield 1602 and a second shield 1604 protecting a reader 1606 from EMI. A reference reader 1608 (a read sensor) is located far from the magnetic media and also shielded from the media by the second shield 1604. First and second leads 1622, 1624 also shield the reference reader 1608 and provide connection to the flex connector. In this manner, the reference reader 1608 will not pick up any readback signals from the disk media. Thus, signals from the reference reader 1608 and its traces 1622, 1624 can be used as a reference signal for suppression of write interference from other readers 1606 and/or for suppression of EMI noise.

For the reference trace to be more effective, symmetry in design should also be considered. Referring to FIG. 17A, an illustration 1700 of a preamplifier 1702 shows that EMI noise is typically $(A+B)\sin \omega t$. Referring to FIG. 17B, an illustration 1720 illustrates a possible implementation for the embodiment of FIG. 16 where trace lines from a preamplifier 1722 to the head/slider reader and reference reader completely cancel the EMI noise.

Figure 18A:
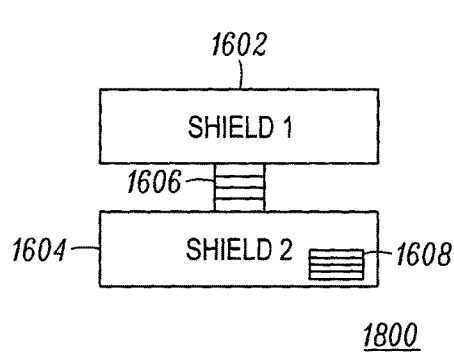
FIGS. 18A and 18B, illustrates a bottom planar view and a side planar cross-section view of reference reader in accordance with a second embodiment.
Figure 18B:
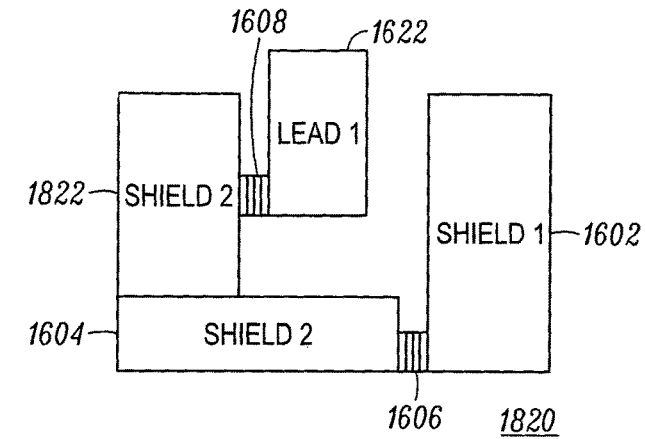
Figure 19:
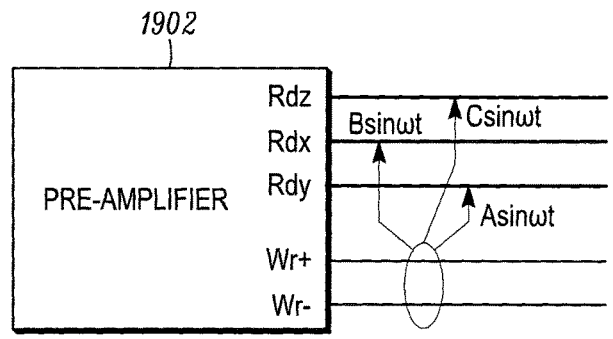
FIG. 19 illustrates a block diagram and trace line implementation of trace lines from the preamplifier to the head/slider of the second embodiment.

Referring to FIG. 18, a second embodiment is depicted in FIG. 18A (a bottom planar view 1800) and FIG. 18B (a side planar cross-sectional view 1820). The second embodiment differs from the first embodiment (FIG. 16) in that the second shield 1604 is merged with a second lead 1822 for the reference reader 1608 and they share the same trace lead to the pre-amplifier. FIG. 19 is an illustration 1900 for the pre-amplifier 1902 where the trace line Rdx comes from the shield 1822, the trace line Rdy comes from the shield 1602 and the trace Rdz comes from the lead 1622. In this manner, EMI Interference $(A-B)\sin \omega t$ between Rdx and Rdy traces can be suppressed using EMI Interference $(A-C)\sin \omega t$ between Rdz and Rdy. For complete cancellation, $Rdx-Rdy=a(Rdz-Rdy)$ where $a=(B-A)/(C-A)$ applies.

Thus, it can be seen that suppressing the write interference in accordance with the present embodiments enables improved servo information recovery during the writing process, thereby overcoming drawbacks in the current state of the art which lacks such write interference suppression schemes. With recovery of servo information during the writing process in a dedicated servo system, an HDD design can have better tracking capability, leading to increased achievable track density. As those skilled in the art can realize, increased track density and servo capabilities have direct impact on areal density of the disk media 120.

In addition, suppression of write interference allows read-while-write which can be used for other technologies such as for write synchronization as needed in two dimensional magnetic recording and bit patterned media. Further, reference read sensors and traces can be used for EMI suppression and cancellation and may relax EMI design requirements for HDDs. While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. An apparatus for controlling operations of a hard disk drive, the apparatus comprising:
   a writer to write onto a disk media of the hard disk drive based on a write signal;
   a reader to (i) read from the disk media of the hard disk drive, and (ii) generate a read signal; and
   at least one write interference module to reduce write interference when the writer is writing to the disk media while the reader is reading from the disk media, wherein
      the at least one write interference module is to (i) receive the write signal, and based on the write signal, determine whether the writer is writing to the disk media,
      the at least one write interference module comprises a reference signal generator and a signal delay device,
      the reference signal generator is to generate a reference write signal,
      the signal delay device is to receive the read signal, and
      the at least one write interference module is to inject the reference write signal, delayed by the signal delay device, into the read signal to suppress the write interference when the writer is writing to the disk media while the reader is reading from the disk media.

2. The apparatus in accordance with claim 1, wherein the at least one write interference module is to reduce the write interference in one or more of a time domain and a frequency domain.

3. The apparatus in accordance with claim 2, wherein the at least one write interference module is to reduce the write interference in the frequency domain.

4. The apparatus in accordance with claim 3, wherein:
   the at least one write interference module comprises one or more filters; and
   the one or more filters are to filter out write interference from the read signal when the writer is writing to the disk media while the reader is reading from the disk media.

5. The apparatus in accordance with claim 2, wherein the at least one write interference module to reduce write interference in the time domain.

6. The apparatus in accordance with claim 1, further comprising a head gimbal assembly to support a slider head, wherein:
   the writer and the reader are mounted on the slider head;
   the reference signal generator is coupled to a reference read sensor; and
   the reference read sensor is mounted on the slider head.

7. The apparatus in accordance with claim 6, wherein:
   the head gimbal assembly includes traces;
   two of the traces provide the read signal from the reader and the write signal to the writer;
   one or more of the traces provide signals from the reference read sensor; and
   the one or more of the traces are also used for electromagnetic interference suppression and cancellation.

8. The apparatus in accordance with claim 1, further comprising a first head gimbal assembly supporting a slider head, wherein:
   the writer and the reader are mounted on the slider head;
   the reference signal generator is coupled to a reference reader;
   the reference reader is mounted on a second slider head; and
   the second slider head is supported on a second head gimbal assembly.

9. The apparatus in accordance with claim 1, wherein:
   the disk media includes a first storage layer and a second storage layer;
   the first storage layer is to store data; and
   the second storage layer is to store servo information.

10. A method for controlling a hard disk drive, the method comprising:
    based on a write signal, writing onto a disk media of the hard disk drive via a writer;
    reading from the disk media of the hard disk drive and generating a read signal;
    generating a reference write signal in response to a reference read signal from a reference reader; and
    injecting the reference write signal to the read signal to reduce write interference when the writer is writing to the disk media while the reader is reading from the disk media, wherein the reduction of the write interference comprises suppression of the write interference in a time domain.

11. The method in accordance with claim 10, wherein the step of write interference reduction comprises frequency domain write interference suppression by filtering out write interference from the read signal when writing to the disk media while reading from the disk media.

12. The method in accordance with claim 11, wherein the reference read signal is also used for electromagnetic interference suppression and cancellation.

13. A hard disk drive device comprising:
    disk media comprising at least two layers for data storage;
    a slider head to fly above the disk media, wherein the slider head includes a writer and a reader;
    a head gimbal assembly to support the slider head above the disk media; and
    at least one write interference module physically coupled to the head gimbal assembly and electrically coupled to the writer and the reader, wherein the at least one write interference module is to reduce write interference from the writer when the writer is writing to the disk media while the reader is reading from the disk media, and
    wherein
       the reader generates a read signal while reading from the disk media,
       the at least one write interference module is to determine whether the writer is writing to the disk media,
       the at least one write interference module comprises a reference signal generator and a signal delay device,
       the reference signal generator is to generate and inject a reference write signal, delayed by the signal delay device, into the read signal to suppress the write interference when the writer is writing to the disk media while the reader is reading from the disk media.

14. The hard disk drive device in accordance with claim 13, wherein:

a first one of the at least two layers is a data storage layer and is to store data; and a second one of the at least two layers is a buried servo layer and is to store location information.

15. The hard disk drive device in accordance with claim 13, wherein:

the at least one write interference module comprises one or more filters; and the one or more filters are to filter out the write interference from the read signal when the writer is writing to the disk media while the reader is reading from the disk media.

16. The hard disk drive device in accordance with claim 13, wherein:

the reference signal generator is coupled to a reference reader along one or more reference read traces; and the one or more reference read traces are used for electromagnetic noise interference reduction.

\* \* \* \* \*